United States Patent [19]
Gros

[11] 3,884,993
[45] May 20, 1975

[54] EPM AND EPDM RUBBERS HAVING IMPROVED PROCESSABILITY

[75] Inventor: Harold J. Gros, Baton Rouge, La.

[73] Assignee: Copolymer Rubber & Chemical Corporation, Baton Rouge, La.

[22] Filed: Apr. 9, 1973

[21] Appl. No.: 348,902

Related U.S. Application Data
[63] Continuation of Ser. No. 109,191, Jan. 25, 1971, abandoned.

[52] U.S. Cl. ........ 260/897 A; 260/897 C; 260/42.33
[51] Int. Cl. ............................................ C08f 37/18
[58] Field of Search ................................ 260/897 A

[56] References Cited
UNITED STATES PATENTS
3,378,512   4/1968   Hamed et al. ................ 260/33.6
3,468,979   9/1969   Hamed et al. ................... 260/897

Primary Examiner—Murray Tillman
Assistant Examiner—C. J. Seccuro

[57] ABSTRACT

Improved processability in EPM and EPDM rubbers has been achieved by blending a previously formed low molecular weight polymer with a previously formed high molecular weight polymer component in the ratios of 0.7 to 1.3 low molecular weight to high molecular weight components and in which in the EPM system the low molecular weight component has a molecular weight average of less than 10,000 and the high molecular weight component has a molecular weight average of $ML_{1+8}$ at 300°F above 90 and in which the EPDM rubber has a low molecular weight component having a molecular weight average of less than 25,000 and a high molecular weight component having a high molecular weight of $ML_{1+8}$ at 300°F in excess of 100.

11 Claims, 1 Drawing Figure

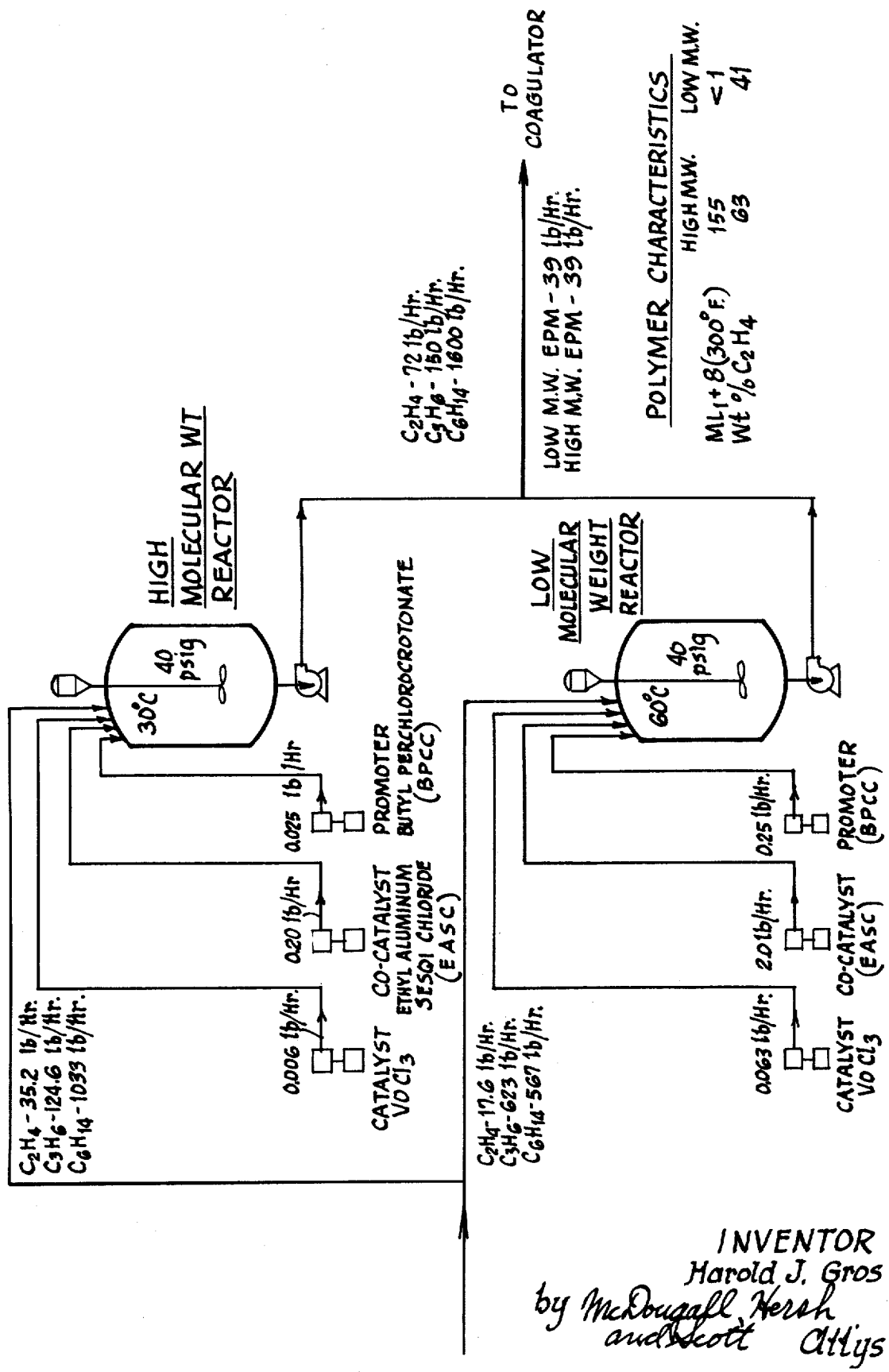

EPM AND EPDM RUBBERS HAVING IMPROVED PROCESSABILITY

This is a continuation of my copending application Ser. No. 109,191, filed Jan. 25, 1971 and entitled "EPM and EPDM Rubbers Having Improved Processability", now abandoned.

This invention relates to synthetic rubbers having improved hot and cold processability and which may also have improved ozone resistance.

The invention will be described with reference to rubbers or elastomers prepared by the interpolymerization of a monomeric mixture of ethylene, at least one alpha-olefin having from 3–16 carbon atoms, preferably propylene, at least one polyene which contains a plurality of carbon-to-carbon double bonds, to produce a rubber generally referred to as an EPDM rubber, which is capable of sulphur vulcanization. It will be understood, however, that the concepts of this invention are applicable also to EPM rubbers formed by the copolymerization of monomers of ethylene and at least one alphamonoolefin having from 3–16 carbon atoms, such as propylene, which, by reason of the lack of a polyunsaturated third monomer which provides ethylenic unsaturation for sulphur vulcanization, requires other types of curing or vulcanizing agents, such as organic peroxide.

Such EPDM rubbers and EPM rubbers and their methods of manufacture are well known to the art and have been made the subject matter of a large number of technical articles and issued U.S. patents.

Such EPDM rubbers and EPM rubbers are usually processed, alone or as blends with other rubbers, such as polybutadiene rubber, styrene-butadiene copolymer rubbers (SBR), styrene-acrylonitrile-butadiene rubbers, chloroprene rubbers, natural rubbers, butyl rubbers and the like, and/or with extender oils, on mills, banbury or by extrusion to produce moldable products for subsequent vulcanization or cure. Thus, the processability of the elastomeric material in equipment of the type described is an important factor in the acceptance of the material for commercial utilization.

It is an object of this invention to produce copolymers and interpolymers of the type described which are characterized by improved processability; which are improved with respect to both hot and cold processability; in which such improved hot and cold processability is achieved with improved ozone resistance, and in which such improved hot and cold processability can be obtained while maintained at Mooney values desired for certain applications.

A careful study has been conducted relating processability of the elastomeric materials to Mooney value compositions as well as molecular weight distribution of the interpolymer. It has been found that the interpolymers that are formed are generally characterized by a molecular weight distribution curve that tapers gradually from a peak at about the calculated average molecular weight to lower molecular weights in one direction and higher molecular weight components in the other direction. Such material has acceptable processability, hot or cold, depending somewhat upon the average molecular weight.

It has been found that the processability of the elastomeric material is somewhat improved if the molecular weight distribution curve is spread out so as to increase the proportion of lower and higher molecular weight interpolymers and that noticeable improvement in processability is achieved when the molecular weight distribution is such as to spread the peaks so as to extend in a low molecular weight range as well as in a high molecular weight range.

One way in which this molecular weight distribution can be achieved is to conduct the polymerization reaction with a first increment of the monomers to form the interpolymer and then adding the remainder of the monomers while continuing the polymerization reaction. Thus the polymer formed with the first increment or increments is further increased in molecular weight to a high molecular weight component while the freshly added monomer is exposed to a lesser amount of polymerization to a low number average molecular weight component.

The preferred process, embodying the features of this invention, is to effect the interpolymerization in separate reactions, in which one reaction is formulated and carried out to provide an interpolymer of low number average molecular weight while the other is formulated and carried out to provide an interpolymer of high number average molecular weight and then blending the interpolymers in the ratio for desired Mooney value to produce an elastomeric product having markedly improved processability.

Conditions for preparation of EPDM and EPM elastomers are well known to the art. For example, for patents which describe procedures for the preparation of EPDM elastomers from monomeric mixtures of alpha-olefins and polyenes, reference can be made to U.S. Pat. No. 2,933,480; No. 3,093,620; No. 3,093,621 and No. 3,211,709, which are incorporated herein by reference.

Such EPDM elastomers are formed by interpolymerization of monomers of ethylene, one or more higher monoolefins having 3–16 and preferably 3–10 carbon atoms, and one or more polyenes. The polyene monomers may include the bridged ring compound, straight or branched chain polyenes or cyclic polyenes containing, for example, 4–20 carbon atoms and preferably about 5–10 carbon atoms and 2 carbon-to-carbon double bonds. The preferred straight chain polyene is generally selected of 1,4-hexadiene, but other straight chain dienes containing 2–18 carbon atoms may be used, such as those disclosed in U.S. Pat. No. 2,933,480. The preferred cyclic polyene is generally selected of 1,5-cyclooctadiene or 2-methyl(1-8-4-9)-tetrahydroindene.

The polyene or other ethylenically unsaturated compound containing a plurality of carbon-to-carbon double bonds may be selected from those disclosed in the prior art for use as third monomers in the preparation of ethylene-propylene-polyene terpolymers, including open chain polyunsaturated hydrocarbons containing 4–20 carbon atoms, such as 1,4-hexadiene, monocyclic polyenes and polycyclic polyenes. The polyunsaturated bridged ring hydrocarbons or halogenated bridged ring hydrocarbons are preferred. Examples of such bridged ring hydrocarbons include the polyunsaturated derivatives of bicyclo(2,2,1)heptane wherein at least one double bond is present in one of the bridged rings, such as dicyclopentadiene, bicyclo(2,2,1)hepta-2,5-diene, the alkylidene norbornenes, and especially the 5-alkylidene-2-norbornenes wherein the alkylidene group contains 1–20 carbon atoms and preferably 1–8 carbon atoms, the alkenyl norbornenes, and especially the 5-alkenyl-2-norbornenes wherein the alkenyl group contains about 3–20 carbon atoms and preferably 3–10 carbon atoms. Other bridged ring hydrocarbons include polyunsaturated derivatives of bicyclo(2,2,2)octane as represented by bicyclo(2,2,2)octa-2,5-diene, polyunsaturated derivatives of bicyclo(3,2,1)octane, polyunsaturated derivatives of bicyclo(3,3,1)nonane, and polyunsaturated derivatives of bicyclo(3,2,2)nonane.

Specific examples of preferred bridged ring compounds include 5-methylene-2-norbornene, 5-ethylidene-2-norbornene, 5-n-propylidene-2-norbornene, 5-isopropylidene-2-norbornene, 5-n-butylidene-2-norbornene, 5-isobutylidene-2-norbornene, dicyclopentadiene, the methyl butenyl norbornenes such as 5-(2-methyl-2-butenyl)-2-norbornene or 5-(3-methyl-2-butenyl)-norbornene, and 5-(3,5-dimethyl-4-hexenyl)-2-norbornene. The elastomer prepared from 5-ethylidene-2-norbornene is much preferred as it has outstanding properties and produces many unusual and unexpected results.

The elastomer may contain chemically bound therein molar ratios of ethylene to propylene varying between 90:10 and 10:90, and preferably between 70:30 and 55:45. The polyene or substituted polyene may be chemically bound therein to replace the ethylene or propylene in an amount of 0.1 to 10 mole per cent, and preferably 0.3 to 1 mole per cent, or in an amount to provide an actual unsaturation level of 2 double bonds per 1,000 carbon atoms in the polymer chain to unsaturation levels as high as 100 double bonds per 1,000 carbon atoms in the polymer, but it is preferred to make use of the third monomer in the form of a polyene in an amount to provide an unsaturation level within the range of 2.5 to 10 carbon-to-carbon double bonds per 1,000 carbon atoms in the interpolymer.

The specific unsaturation level selected in a given instance will vary depending upon the properties which are desired in the elastomer, as is well recognized in the art.

In instances where it is desirable to prepare a tetra polymer, or an interpolymer containing 5 or more different monomers, then one or more alpha-monoolefins containing 4–16 and preferably 4–10 carbon atoms may be substituted for an equal molar quantity of bound propylene in the described polymer composition. For instance, the preferred range of the fourth monomer in tetra polymers will usually be about 5 to 20 mole per cent, but smaller amounts may be present, such as in the range of 1 to 4 mole per cent.

The interpolymerization reaction is carried out in the presence of a catalyst in a solvent medium. The polymerization solvent may be any suitable inert organic solvent that is liquid under reaction conditions and it may be a prior art solvent for solution polymerization of monoolefins in the presence of Ziegler type catalyst. Examples of satisfactory hydrocarbon solvents include straight chain paraffins having from 5–8 carbon atoms, with best results often being secured by the use of hexane; aromatic hydrocarbons and preferably an aromatic hydrocarbon having a single benzene nucleus, such as benzene, toluene and the like; and saturated cyclic hydrocarbons having boiling point ranges approximating those of the straight chain paraffin hydrocarbons and aromatic hydrocarbons described above, and preferably saturated cyclic hydrocarbons having 5–6 carbon atoms in the ring nucleus. The solvent selected may be a mixture of one or more of the foregoing hydrocarbons and preferably a mixture of aliphatic and naphthenic hydrocarbons having approximately the same boiling range as normal hexane. It is desirable that the solvent be dry and free of substances that will interfere with the Ziegler type catalyst used in the polymerization reaction.

Ziegler catalysts of the type well known to the prior art may be used. Such Ziegler type catalysts are disclosed in a large number of patents, such as U.S. Pat. No. 2,933,480, No. 3,093,620, No. 3,093,621, No. 3,211,709 and No. 3,113,115. Examples of Ziegler catalysts include metal organic coordination catalysts prepared by contacting a compound of a heavy metal of the group IV-a, V-a, VI-a and VII-a of the Mendeleeff periodic system of elements, such as titanium, vanadium and chromium halides with an organo-metallic compound of a metal of groups I, II or III of the Mendeleeff periodic system which contains at least one carbon-metal bond, such as trialkyl aluminum, and alkyl aluminum halides in which the alkyl groups contain from 1–20 and preferably 1–4 carbon atoms.

The preferred Ziegler catalyst for interpolymerization to produce EPDM or EPM polymers is prepared from a vanadium compound and an alkyl aluminum halide. Examples of suitable vanadium compounds include vanadium trichloride, vanadium tetrachloride, vanadium oxychloride, vanadium acetyl acetonate, etc. Activators which are especially preferred include alkyl aluminum chlorides of 3,113,115. general formula $R_1AlCl_2$ and $R_2AlCl$ and the corresponding sesquichlorides of the general formula $R_3Al_2Cl_3$, in which R is methyl, ethyl, propyl, butyl or isobutyl. In the catalyst system, the aluminum to vanadium mole ratio of the aluminum and vanadium compounds may be within the range of 5/1 to 200/1 and preferably within the range of 15/1 to 60/1, with best results being secured in the ratio of 40 aluminum to 1 vanadium. These same ratios apply with respect to corresponding compounds of others of the heavy metals susstituted for the vanadium compound and the organo-metallic compounds of groups I, II or III for the aluminum compounds. A catalyst prepared from alkyl aluminum sesquichloride, such as the methyl or ethyl aluminum sesquichloride and vanadium oxychloride is preferred in the ratio of 1 mole vanadium oxychloride per 5–200 moles of aluminum and more preferably 15–60 moles of aluminum, with 40 moles of aluminum per mole of vanadium yielding the best results.

The polymerization is preferably carried out on a continuous basis in a reaction vessel closed to the outside atmosphere, which is provided with an agitator, cooling means and conduit means for continuously supplying the ingredients of the reaction including monomer, catalyst and accelerators and conduit means for continuously withdrawing solution containing elastomer. The polymerization is carried out in a liquid phase in the organic solvent in the presence of a Ziegler catalyst. The solution of elastomer in the polymerization solvent is withdrawn continuously from the reaction vessel, the catalyst is killed by the addition of a catalyst deactivator, such as methanol or water, and the organic solvent is removed. The solvent may be removed by injecting the solution into a body of boiling water to which steam is supplied. The polymer forms into acrumb which is removed as a slurry from the vessel and the polymerization solvent is withdrawn overhead as a vapor. The crumb may be freed of traces of solvent and washed to free the crumb of catalyst residues after which the water is removed by means of a screen or other drier whereupon the crumb is ready for baling or use in conventional practice.

The desired results are achieved, in accordance with the practice of this invention, when use is made of a low molecular weight component having a number average molecular weight less than 25,000 and preferably less than 15,000, and a high molecular weight component of more than 100 ($ML_{1+8}$ at 300°F) and preferably within the range of 130 to 165 ($ML_{1+8}$ at 300°F) Mooney viscosity, with the ratio of low molecular weight component to high molecular weight component being within the range of 0.7 to 1.3 parts by weight of the low molecular weight component to 1 part by weight of the high molecular weight component. The foregoing is applicable to a system formed of EPDM interpolymers of the type described. When the elastomer system is an EPM system, the low molecular weight component should have a number average molecular weight of less than 10,000 and preferably less than 5,000, while the high molecular weight component, when measured from the standpoint of Mooney viscosity, should have a viscosity of more than 90 ($ML_{1+8}$ at 300°F) and preferably within the range of 110 to 140 ($ML_{1+8}$ at 300°F) with the ratio of low to high molecular weight components corresponding to the weight ratios described above for the EPDM interpolymers.

When the weight ratio of low molecular weight component to high molecular weight component is less than 0.7, the resulting elastomer is not characterized by improved processability. When the weight ratio of low to high molecular weight components exceeds 0.7 unexpected improvements in both hot and cold processability of the resulting blend are secured.

It will be understood that muleiple low molecular weight components and/or multiple high molecular weight components, within the ratio described, can be blended. The desired improvement in processability is also experienced even though the entire elastomeric system is not made up of the high-low component blend as long as the high-low blend component described makes up at least 50% of the final elastomeric product. In other words, elastomers other than the high molecular weight component and low molecular weight component blended in accordance with the practice of this invention can be mixed with the blend as long as the amount of such other elastomeric materials do not exceed 50% of the final elastomeric system.

For processability, the amount of low molecular weight interpolymer is important. For ozone resistance, the high molecular weight component is more controlling. Thus, it is desirable to start with the high molecular weight component sufficient to give the desired ozone resistance and then blend with the low molecular weight component in amounts to secure the desired Mooney value for the final product.

Improvement in cold mill processability is not experienced if either blend component is formulated to contain ethylene in the interpolymer in an amount which exceeds the onset of ethylene crystallinity. For the EPM system, this point is reached when the ethylene content of the copolymer exceeds 70% and for the EPDM system, this point is reached when the ethylene content exceeds 80%.

The resulting blends of the interpolymers may be cured, following prior art procedures. As a general rule, for the EPDM interpolymers, curing procedures normally followed in curing highly unsaturated hydrocarbon rubbers, such as styrene-butadiene rubber, natural rubber, polybutadiene rubbers, synthetic polyisoprene rubbers and the like, are satisfactory. Various curing procedures, including materials and the quantities thereof to be employed, are described in various publications well known to the art, such as "Principles of High Polymer Theory and Practice," Schmidt et al., McGraw-Hill Book Company, New York (1948); "Chemistry and Technology of Rubber," Davis et al., Reinhold Publishing Corporation, New York (1937); "The Applied Science of Rubber," edited by W. J. S. Naunton, published by Edward Arnold, Ltd., London (1961), "The Encyclopedia of Chemical Technology," Kirk and Othmer, published by Innerscience Encyclopedia, Inc., New York (1953), and "Compounding Ingredients for Rubbers," 3rd edition, Cuneo Press of New England, Cambridge, Massachusetts.

As is taught by the above-mentioned tests, rubbery polymers may be vulcanized with vulcanizing agents including, for example, sulphur or sulphur-bearing compounds which provide sulphur under the vulcanizing conditions. Sulphur is the preferred vulcanizing agent, and it is usually used in an amount of about 0.5 to 3, and preferably about 1 to 2, parts by weight per 100 parts by weight of rubber in the blend. Zinc oxide and other metal oxides may be used in an amount of, for example, about 2 to 10 parts by weight per 100 parts by weight of rubber (phr). Vulcanization accelerators such as tetramethylthiuram monosulfide, tetramethylthiuram disulfide, the zinc salt of dimethyl dithiocarbamic acid, N,N-diethylthiocarbamyl-3-mercaptobenzothiazole and 2-mercaptozoline may be used.

Conventional fillers and pigments may be incorporated with the rubber, such as about 10 to 200 phr of carbon black, finely divided silica, esterified silica, titanium dioxide, kaolin and whiting. It is also possible to oil extend the elastomer. Naphthenic oils for use in processing or extending rubbery polymers are preferred, and are usually added in an amount of about 10 to 200 phr and preferably about 20 to 80 phr. Other types of oil may be used, such as the aromatic, highly aromatic and paraffinic oils.

Vulcanization is accomplished by heating the compounded elastomer described above at a vulcanizing temperature and for a period of time sufficient for the vulcanization reaction to occur. A temperature above 130°C for about 10–90 minutes, and preferably about 160°–180°C for about 30 minutes, is often satisfactory. The specific time and temperature that are selected in a given instance will depend upon the nature of the vulcanizing agent, accelerator, and other ingredients which are present. With curing methods that make use of molten salts, temperatures as high as 370°C for 30 seconds are satisfactory.

Free radical cures may be used with the EPDM blends and they may also be used for cure of the EPM blends which do not originally contain unsaturated groupings capable of sulphur vulcanization. When carrying out a free radical cure, a heat activated free radical curing agent is admixed with the polymer and then the mixture is heated to a sufficiently high temperature for activation of the curing agent to obtain a cure over a short period of time. Usually, temperatures in the range of 50°–175°C for several minutes to several hours is sufficient. Preferred free radical curing agents includes organic peroxides such as dicumyl hydroperoxide, dibenzoyl peroxide, cumene hydroperoxide, ditertiarylbutyl peroxide, etc.

The cured elastomers of this invention may be used in a wide variety of articles including tires, belts, hose, tubing and the like. In processing the blend compositions of this invention, noticeable improvement is secured in the processing characteristics as will hereinafter be described.

Having set forth the basic concepts of the invention, the following examples will be given by way of illustration, but not by way of limitation:

EXAMPLE 1

This example illustrates the simultaneous production, in separate reactors, as illustrated in the accompanying flow diagram, of the preparation of a high molecular weight EPDM and a low Mooney weight EPM which are subsequently joined in accordance with the practice of this invention.

As illustrated in the accompanying diagram, ethylene ($C_2H_4$), at a rate of 35.2 lbs./hr, propylene ($C_3H_6$) at a rate of 124.6 lbs./hr. and hexane ($C_6H_{14}$) at a rate of 1033 lbs./hr. are introduced into a reaction vessel with vanadium oxytrichloride catalyst introduced at a rate of 0.006 lbs./hr and ethyl aluminum sesquichloride cocatalyst introduced at a rate of 0.2 lbs./hr. with butyl perchlorocrotonate promoter introduced at a rate of 0.025 lbs./hr. and reacted at a temperature of 30°C under 40 p.s.i.g. to produce a high molecular weight EPM having a Mooney viscosity of 155 ($ML_{1+8}$ at 300°F) and an ethylene content of 63%.

In a separate reactor, in parallel with the first, ethylene at a rate of 17.6 lbs./hr., propylene at a rate of 62.3 lbs./hr. and hexane at a rate of 567 lbs./hr. are introduced with vanadium oxytrichloride catalyst at a rate of 0.063 lbs./hr., ethyl aluminum sesquichloride cocatalyst at a rate of 2 lbs./hr. and butyl perchlorocrotonate promoter at a rate of 0.25 lbs./hr. are reacted at 60°C under 40 p.s.i.g. to produce a low molecular weight DPM having a Mooney viscosity of less than 1 ($ML_{1+8}$ at 300°F) and containing approximately 41% ethylene.

The high and low molecular weight copolymers are mixed in equal proportions at a rate of 39 lbs./hr. each and sent to the coagulator for separation of the blended copolymers as crumb.

EXAMPLE 2

This example illustrates the preparation of a high molecular weight EPDM interpolymer with intermediate unsaturation and which may be used as the high molecular weight component of a blend embodying the features of this invention.

The reaction vessel is a one-half gallon Sutherland reactor equipped with a high speed, heavy duty, air driven motor, cooling coils, a thermometer, a temperature regulator, a pressure indicator, an injection port, and other openings where monomer, catalyst and solvent are fed into the reactor. A tubing communicates with the bottom of the reactor for the removal of cement, which is produced on a continuous basis. A vapor phase vent is provided to bleed off 15% of the gaseous monomer feed to prevent buildup of inert gas.

The cleaned and dry reactor is flushed with propylene for about 15 minutes. The temperature is lowered to ambient temperature and 1 liter of dry hexane is introduced into the reactor. As the temperature is raised to 30°C, dry propylene is fed to the reactor until 42.2 inches of mercury pressure is reached. The pressure is then raised to 61 inches of mercury with dry ethylene and 4.4 millimoles (0.61 cc) of pure 5-ethylidene-2-norbornene and 1.3 cc of 1.5 M ethyl aluminum sesquichloride are added.

The monomer feeds are stopped and the catalyst components, i.e., 0.525 molar solution of ethyl aluminum sesquichloride and a 0.0543 molar solution of vanadium oxytrichloride, at a 12 to 1 aluminum to vanadium ratio are fed into the reactor at a constant rate until a drop in pressure is noted. At this time, gaseous monomers are fed into the reactor at a rate of 1542 cc per minute of which 699 cc are ethylene and 846 cc are propylene. The 5-ethylidene-2-norbornene is added as a 0.03 molar solution in hexane and 0.009 molar in pyridine, at a rate of 1.3 cc per minute to provide about 3.2% by weight for incorporation into the interpolymer.

The polymerization is controlled by the catalyst pumps which add catalyst on demand as the pressure increases, thus maintaining the 61 inches of mercury pressure throughout the run. When the solution in the reactor contains 6% polymer, fresh solvent containing 16 cc of ethylene per cc of solvent is fed into the reactor at the rate of 26.5 cc per minute and the polymer cement is taken off continuously at a rate to produce about 90.4 grams polymer per hour.

At this time, the ethylene and propylene feeds are adjusted to 345 cc per minute and 1843 cc per minute, respectively, to compensate for the unreacted monomers removed with the cement. The feed rate of solution of 5-ethylidene-2-norbornene is adjusted to 2.7 cc per minute.

The cement is fed from the reactor to a Waring blender containing water for intimate mixing. The cement is washed three times with equal volumes of water and then it is stabilized with 1 part by weight per 100 parts by weight of rubber of a stabilizer (SDAO, a product of Naugatuck Chemical Company) and is fed under nitrogen pressure into a T-joint at the base of a container filled with hot circulating water. The other end of the T is connected to a steam line for admission of steam at a rate to superheat the rubber cement. The solvent and unreacted monomers are removed, for the most part, by this procedure and the interpolymer is collected as a crumb on a screen and then washed and dried in an oven at 90°C.

The interpolymer contains ethylene and propylene in a ratio of 60 moles of chemically bound ethylene to 40 moles of chemically bound propylene and the low Mooney value of the polymer is about 157 ($ML_{1+8}$ at 250°F).

Based upon the chemically bound 5-ethylidene-2-norbornene, the calculated or theoretical unsaturation level, expressed as carbon-to-carbon double bonds per 1000 carbon atoms, is 3.7.

By suitable adjustment of the polymerization temperature and the diene feed rate, it is possible to prepare interpolymers with various Mooney values and unsaturation values. Whenever the temperature is increased, it is necessary to feed more of the ethylene and propylene monomers to compensate for the greater loss of these monomers in the product stream because of their increased solubility at lower temperatures. The Mooney viscosity or average molecular weight of the interpolymer increases with a decrease in the reaction temperature by about 5–10 Mooney points per degree centigrade. Thus it is possible, in the reaction of Example 1, to produce both a high Mooney viscosity rubber of high average molecular weight, as in Example 1, or a low Mooney viscosity rubber of low average molecular weight by increasing the reaction temperature in the manner described above.

EXAMPLE 3

This example illustrates the production of an interpolymer of the typoe produced in Example 2 but of low average molecular weight.

In a reactor similar to that of Example 2, 1 liter of hexane is introduced into the reaction vessel. As the temperature is raised to 30°C, dry propylene was fed to the reactor until 42.2 inches of mercury pressure was reached. The pressure was then raised to 61 inches of mercury with a feed of dry ethylene and 6.03 millimoles (1.63 cc) of 5-ethylidene-2-norbornene and 1.3 cc of 1.5 molar ethyl aluminum sesquichloride were added.

The monomer feeds were stopped and the catalyst components, i.e., 0.545 molar solution of ethyl aluminum sesquichloride and 0.054 molar solution of vanadium oxytrichloride, at a 12 to 1 aluminum to vanadium ratio, were fed into the reactor at a constant rate until a drop in pressure was noted. At this time, the gaseous monomers were fed into the reactor at a rate of 1501 cc per minute of which 692 cc were ethylene and 809 cc were propylene. The 5-ethylidene-2-norbornene was added as a 0.3 molar solution in hexane which also was 0.01 molar in pyridine, at a rate of 3.57 cc per minute to provide about 8.6% by weight for incorporation into the interpolymer. The polymerization was controlled by the catalyst pumps which added catalyst on demand in response to increased pressure. When the solution in the reactor contained 6% polymer, fresh solvent containing 16 cc of ethylene per cc of solvent was introduced into the reactor at the rate of 26.5 cc per minute and polymer cement was taken off continuously to produce about 90.4 grams of polymer per hour.

At this time, the ethylene and propylene feeds were adjusted to 310 cc per minute and 1645 cc per minute, respectively, to compensate for the unreacted monomers removed with the cement. The feed rate of solution of 5-ethylidene-2-norbornene was adjusted to 4.23 cc per minute.

The cement was processed in the manner described in Example 2. The resulting interpolymer contained ethylene and propylene in a ratio of 59 mole percent of chemically bound ethylene to 41 mole percent of chemically bound propylene and the molecular weight of the interpolymer as measured by specific viscosity of 0.1% solution in Decalin at 135°C was 1.88.

The level of unsaturation, based upon the amount of chemically bound 5-ethylidene-2-norbornene in the interpolymer was 10 carbon-to-carbon double bonds per 1,000 carbon atoms.

While the components of Examples 2 and 3 may be blended in the desired amounts after coagulation, in the preferred practice of the invention the cements of Examples 2 and 3 are blended in the desired ratios followed by washing, stabilization and coagulation as in Example 2.

EXAMPLE 4

The procedure followed in this example was the same as in Example 3 except that the reaction temperature was 25°C and the initial charge to the reactor contained 34.6 millimoles of 5-(2-methyl-2-butenyl)-2-norbornene and 20 microliters of pyridine. The catalyst was prepared from 1.06 molar solution of ethyl aluminum chloride and 0.105 molar solution of vanadium oxytrichloride, using a 12 to 1 molar ratio of aluminum to vanadium.

The continuous feed of the gaseous monomers to the reactor, after the initial charge, was at a rate of 1726 cc per minute, of which 711 cc were ethylene and 1015 cc were propylene. The 5-(2-methyl-2-butenyl)-2-norbornene was added as a 0.5 nolar solution in hexane which also was 0.01 molar in pyridine, at a rate of 6.89 cc per minute to provide about 29% by weight in the polymer. When the solution in the reactor contained 7% by weight of polymer, fresh solvent containing 16 cc of ethylene per cc of solvent was fed to the reactor at a rate of 27 cc per minute and polymer cement was removed continuously at a rate to produce 126 grams per hour.

At the time of commencing continuous operation, the ethylene and propylene feeds were adjusted to 363 cc per minute and 2,205 cc per minute, respectively. The feed rate of the solution of 5-(2-methyl-2-butenyl)-2-norbornene was increased to 9.36 cc per minute.

The resulting polymer contained ethylene and propylene in the ratio of 66 mole percent of chemcially bound ethylene and 34 mole percent of chemically bound propylene and the interpolymer had a reduced specific viscosity (0.1% in Decalin at 135°C) of 1.12.

The calculated or theoretical unsaturation level was 25 carbon-to-carbon double bonds per 1,000 carbon atoms.

The following table provides a comparison of overall processability, including mill and extrusion processability, of various EPM rubbers blended of high and low molecular weight components and unblended rubber having similar intrinsic viscosities of about 28 ± 3 ($ML_{1+8}$ at 250°F) and in which measurements for processability were made with the rubbers compounded in accordance with the following recipe:

| Ingredients | Parts by weight |
|---|---|
| Polymer rubber | 100 |
| Vulcan 3 | 50 |
| DiCup 40C | 6.5 |
| Sulphur | 0.3 |

In the tables that follow, the term Mn refers to the number average molecular weight of the interpolymer or copolymer.

TABLE I

PROCESSING CHARACTERISTICS OF EPM POLYMERS

| | Product Mass Hi/Lo | Low MW Comp. Mn | % C. | Hi MW Comp. $ML_{1+8}$ (250°F) | % C. | Processing Rating Overall |
|---|---|---|---|---|---|---|
| A | No Blend | — | — | — | — | Very poor |
| B | 0.8/1 | 5,450 | ~53 | 65 | 68 | Good |
| C | 0.53/1 | 12,900 | ~56 | 100 | 67 | Good |
| D | 1/1 | 5,450 | ~51 | 100 | 67 | Good |
| E | 0.64/1 | 1,380 | ~56 | ~112 | 67 | Superior |
| F | 0.46/1 | 1,380 | ~56 | ~112 | 70 | Good |

It will be noted from the table that composition A, formed of single interpolymer reacted to the desired viscosity range for average molecular weight, had very poor processability. Processability was improved with blends of 0.46/1 parts by weight of low molecular weight component to 1 part by weight of high molecular weight component with the amounts adjusted to give the same intrinsic viscosities as the single reaction product of composition A. Best results were secured with a blend of 0.64 parts by weight of a low molecular weight component having a molecular weight average of 1,380 Mn to 1 part by weight of a high molecular weight component having an average molecular weight as measured by intrinsic viscosity of 112 ($ML_{1+8}$ at 250°F). When the Mn of the low molecular weight component exceeds 12,000, as in composition C, processability falls but not to the level of the single component system.

The following data has reference to EPDM systems in which comparison is made for hot mill and cold mill processability. Again an attempt was made to maintain the Mooney values as close to one another as possible for comparison between rubbers and blends having similar Mooney values.

within the crystallinity range. As a result, the cold mill processability falls noticeably although hot mill processability remains improved. Where the high molecular weight content is higher than the low molecular weight component, as in composition F, both the hot and cold mill processability deteriorates.

The following table sets forth the data secured in tests on three different compounded rubbers for ozone resistance. Compound 1 is a standard unblended EPDM rubber having an intrinsic viscosity of 42 ($ML_{1+8}$ at 250°F) with 5 carbon-to-carbon double bonds per 1,000 carbon atoms and an ethylene content of 73.2%. Compound 2 represents a 0.98 to 1 blend of a low molecular weight EPDM rubber having a viscosity measurement of 3 cps at 6.5% solution in hexane, an ethylene content of 55% and 4.2 carbon-to-carbon double bonds per 1,000 carbon atoms and 65% by weight of a high molecular weight EPDM having an intrinsic viscosity of 120 ($ML_{1+8}$ at 250°F), an ethylene content of 75% and 4 carbon-to-carbon double bonds per 1,000 carbon atoms. Compound 3 is a commercial EPM rubber of Uniroyal Inc., identified as Royalene 301 T. The three rubbers were compounded in accor-

TABLE II

| DESIGNATION | BLENDED POLYMER | | | | LOW MOLECULAR WEIGHT COMPONENT | | | | HIGH M.W. COMPONENT | PROCESSABILITY | |
|---|---|---|---|---|---|---|---|---|---|---|---|
| | UN-SATURATION C=C | COMPO-SITION % $C_2$= | MOONEY VISCOSITY $ML_{1+8}$ (250°F) | BLEND RATIO HI/LO | POLYMER VISCOSITY CENTIPOISE at % VS | Mn | COMPO-SITION MOLE % $C_2$= | POLYMER VISCOSITY $ML[_{1+8}$ (250°F) ] | COMPO-SITION MOLE % $C_2$= | COLD MILL | HOT MILL |
| A | 5.0 | 66.0 | 40 | 0.00 | — | — | — | — | — | V.P. | V.P. |
| G | 4.0 | 54.7 | 40 | 0.66 | 6 at 7.8 | 12,500 | 47 | 105 | 64 | P. | V.P. |
| I | 3.0 | 54.5 | 40 | 0.88 | 6 at 7.8 | 12,500 | 47 | 130 | 68 | G. | F. |
| K | 4.0 | 53.6 | 40 | 1.33 | 6 at 7.8 | 12,500 | 47 | 165 | 68 | F. | V.P. |
| H | 4.0 | 55.0 | 39 | 0.56 | 4.5 at 8.7 | 10,000 | 46 | 105 | 64 | P. | P. |
| J | 3.0 | 53.5 | 41 | 0.83 | 4.5 at 8.7 | 10,000 | 46 | 130 | 68 | G. | G. |
| L | 4.0 | 53.5 | 38 | 1.44 | 4.5 at 8.7 | 10,000 | 46 | 165 | 68 | F. | V.P. |
| B | ~6 | 69.9 | 47 | 1.00 | 2.8 at 5.3 | 4,400 | 70 | 135 | 69 | V.G. | G. |
| C | 4.0 | 59.7 | 45 | 1.00 | 5.0 at 8.3 | — | ~52 | 125 | 74 | V.G. | G. |
| F | 6.0 | 78.2 | 53 | 1.40 | — | 11,000 | 79 | 90 | 74 | V.P. | V.P. |
| E | 5.0 | 73.0 | 37 | 0.90 | | 11,900 | 67 | 130 | 80 | V.P. | F. |

It will be seen from the above that the processability of the rubber is markedly improved by reason of the blend of low and high molecular weight portions by comparison with the poor processability of a single reaction product of similar viscosity as represented by composition A. It will also be noted that the processability improves with increase in the ratio of low molecular weight component to high molecular weight component up to a 1:1 ratio and then falls off slightly, especially in hot mill processability, as the ratio exceeds 1:1.

The importance of ethylene content is illustrated in compositions E and F. In composition E, the ethylene content of the high molecular weight component is dance with the following recipe and tested for cracking in ozone at 50 and 100 pphm:

| Ingredients | Parts by weight |
|---|---|
| EPDM | Variable |
| SBR 1502 | 30 |
| Pale Crepe | 50 |
| A.O. 2246 | 1 |
| Zinc Oxide | 20 |
| Titanium dioxide | 40 |
| Hard Clay | 20 |
| Sunproof improved wax | Variable |
| Circolite Oil | 5 |
| Stearic Acid | 2 |
| Ultramarine Blue | 0.2 |
| NOBS Special | 0.8 |
| DOTG | 0.5 |
| Crystex Sulfur | 3 |

TABLE III

| | Hours to Crack | | | |
|---|---|---|---|---|
| | 50 pphm O$_3$ | | 100 pphm O$_3$ | |
| Parts EPDM | 20 | 20 | 20 | 20 |
| Parts Wax | — | 5 | — | 5 |
| 1 | 24 | no cracks | 4 | 12 |
| 2 | no cracks | no cracks | no cracks | 16 |
| 3 | 24 | 24 | 9 | 9 |

It will be seen that at 50 pphm ozone, the Royalene 301 T and the unblended EPDM rubber without oil addition cracked within 24 hours but that the blend of high and low molecular weight EPDM rubbers, with or without oil, resisted cracking for 24 hours. Similar improvements are exhibited in the tests for exposure to 100 pphm ozone.

The concepts of this invention provide a number of advantages. The degree of molecular weight distribution can be precisely controlled with marked improvement in processability of the rubber blend. Blending in accordance with the practice of this invention permits greater flexibility in commercial operations and provides for greater uniformity of rubber from batch to batch. Flexibility is introduced into the process to enable production of either a wide or narrow molecular weight distribution polymeric system. The degree of molecular weight distribution for a given polymeric system will be a function of processability which is sought to be secured, the amount of stress-strain properties desired as well as economic considerations. The improved processability is achieved in accordance with the practice of this invention without noticeable loss in stress-strain properties normally associated with straight oil master-batching.

It will be apparent that I have provided a means for improving processability of EPDM and EPM rubbers as well as improved ozone resistance without material undesirable effect on any of the other properties desired in the elastomeric system and that I have provided means for achieving controlled molecular weight distribution to provide for peaks in the low and high molecular weight ranges whereby improvements in cold and hot mill processabilities as well as extrusion are secured.

It will be understood that changes may be made in the details of formulation and operation without departing from the spirit of the invention, expecially as defined in the following claims.

I claim:

1. The method of inproving the processability and ozone resistance characteristics of elastomers of ethylene and monoolefin having from 3–16 carbon atoms (EPM) and elastomers of ethylene, a monoolefin having from 3–16 carbon atoms and a polyene (EPDM) comprising blending solution of separately formed low molecular weight and high molecular weight polymers of the respective elastomers, in the ratio of 0.7 to 1.3 parts by weight of the low molecular weight polymer per 1 part by weight of the high molecular weight polymer, in which, for the EPDM elastomeric system, the low molecular weight polymer is an EPDM having a molecular weight average less than 25,000 and the high molecular weight polymer is an EPDM having an average molecular weight measured by Mooney level of $ML_{1+8}$ at 300°F which is greater than 100 and in which, for the EPM elastomeric system, the low molecular weight polymer is an EPM having an average molecular weight of less than 10,000 and the high molecular weight polymer is an EPM having an average molecular weight measured by Mooney level of $ML_{1+8}$ at 300°F which is greater than 90, separating the blended solids by coagulation, and processing the solid blend by milling or extrusion.

2. The method as claimed in claim 1 in which the average molecular weight for the low molecular weight component in an EPDM elastomer is less than 15,000 and the average molecular weight for the high molecular weight component is $ML_{1+8}$ at 300°F which is greater than 130.

3. The method as claimed in claim 1 in which the average molecular weight for the low molecular weight component in an EPM elastomer is less than 5,000 and the average molecular weight of the high molecular weight component is $ML_{1+8}$ at 300°F at between 100 and 140.

4. The method as claimed in claim 1 in which the EPM elastomer is an interpolymer of ethylene and propylene.

5. The method as claimed in claim 1 in which the monoolefin is propylene in the EPDM elastomer.

6. The method as claimed in claim 1 in which the polyene is a polyunsaturated, halogenated or unhalogenated bridged ring hydrocarbon.

7. The method as claimed in claim 1 in which the polyene is a 5-alkylidene-2-norbornene in which the alkylidene group contains from 1–20 carbon atoms.

8. The method as claimed in claim 1 in which the polyene is a 5-alkylidene-2-norbornene in which the alkylidene group contains from 1–8 carbon atoms.

9. The method as claimed in claim 1 in which the polyene is 5-ethylidene-2-norbornene.

10. The method as claimed in claim 1 in which for the EPDM elastomeric system the low molecular weight and the high molecular weight polymers are blended in the ratio of 0.5 to 1.3 parts by weight of the low molecular weight polymer per 1 part by weight of the high molecular weight component.

11. The method as claimed in claim 1 in which the solid blend is milled in a Banbury.

* * * * *